April 8, 1969  H. K. WORNER  3,437,330
CONTINUOUS PRODUCTION OF ALPHA PLASTER
Filed Nov. 14, 1966  Sheet 2 of 2

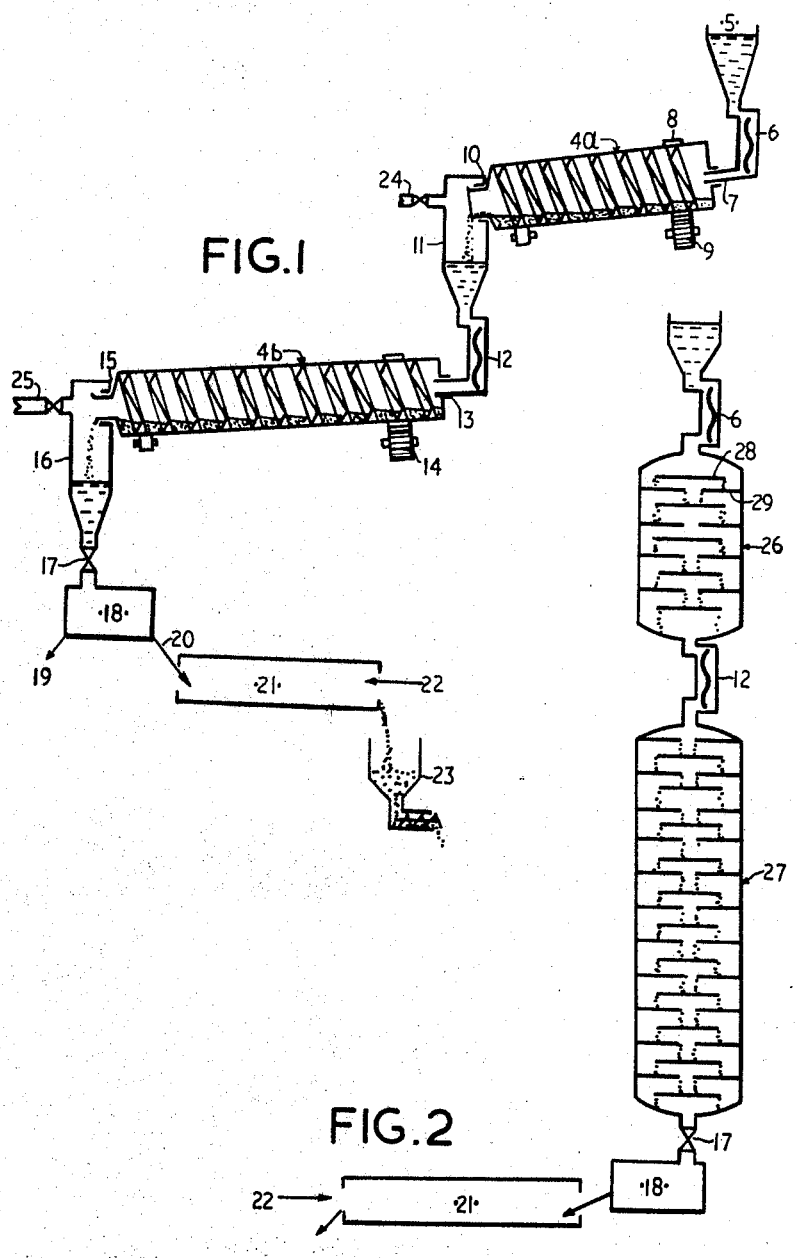

United States Patent Office 3,437,330
Patented Apr. 8, 1969

3,437,330
CONTINUOUS PRODUCTION OF ALPHA PLASTER
Howard Knox Worner, North Balwyn, Victoria, Australia, assignor to Conzinc Riotinto of Australia Limited, Melbourne, Victoria, Australia, a corporation of Victoria, Australia
Filed Nov. 14, 1966, Ser. No. 594,104
Claims priority, application Australia, Nov. 26, 1965, 67,142/65
Int. Cl. C04b 1/04
U.S. Cl. 263—53        8 Claims

ABSTRACT OF THE DISCLOSURE

This invention relates to the method and apparatus for the continuous manufacture of a high strength alpha plaster or alpha hemihydrate, also known as "alpha gypsum" and as "Hydrocal." It is achieved by a novel process using a wet gypsum slurry feed to produce a dry, high strength plaster product, by the careful regulation of the temperature and pressure, wherein the temperature and pressure are higher in the second and subsequent calcining chambers than in the first, and with the flow of the gypsum through the calcining chambers being controlled by gravity.

---

Figure 3:
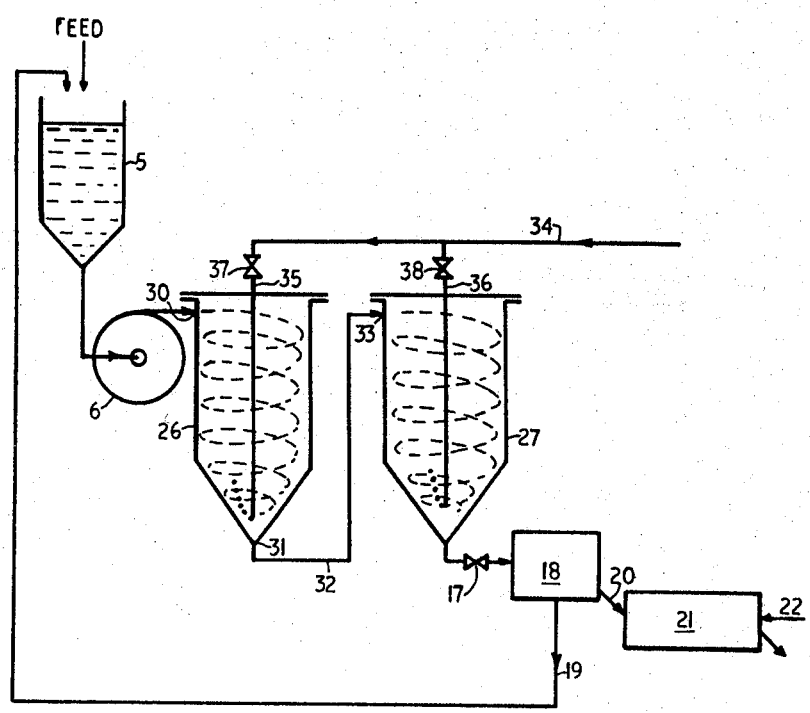

This invention relates to the continuous manufacture of alpha plaster or alpha hemihydrate, also known as "alpha gypsum" and as "Hydrocal" and is an improvement on the method and equipment described in our Australian Patent No. 275,443.

Experience with the operation of a small rotating "autoclave" designed in accordance with the abovementioned application indicated that it would be advantageous to achieve the continuous calcination in at least two stages rather than in one chamber, and, further, that it would be easier to handle the particulate feed and product in slurry form.

In one general form the invention consists in a method of manufacturing alpha plaster comprising the steps of feeding particulate gypsum in the form of a slurry with water, with or without other additions, at a controlled rate into a heated chamber pressurised with steam and water and at a temperature between 110° C. and 125° and with such residence time that the particles of gypsum are substantially converted to fine crystals of alpha hemihydrate, transferring the reacted slurry to another or other chambers at the higher pressures and temperatures but not above 180° C., allowing sufficient residence time in this chamber or these chambers for the minute crystals of alpha hemihydrate to grow, removing the calcined material from the last pressurised chamber and dewatering and drying it, while still maintaining a temperature high enough to prevent substantially rehydration of the alpha plaster, until it has substantially dried.

The invention in another form comprises, in combination, at least two calcining chambers, means for controlled feeding of the first chamber at or near one end with a slurry of particulate gypsum in water, means for causing the slurry to move continuously through the chamber to an outlet at or near the other end, means for heating the contents of the chamber, means for transferring the partially calcined material from this first chamber to another or other chambers at higher temperatures and pressures, such transfer being carried out in such a manner as to prevent the temperature of the slurry from dropping substantially below the temperature in the first chamber, means for causing the slurry to move continuously through the second and any subsequent chambers, means for maintaining the second and any subsequent chambers at temperatures and pressures higher than that of the first chamber, means for discharging the alpha plaster in slurry form from the last calcining chamber and means for dewatering and drying such slurry while still maintaining the temperature high enough to prevent substantially any rehydration of the alpha plaster.

It is difficult to define precisely the various conditions for putting the invention into effect. Experimental work in Australia discloses differences in the required operating conditions when treating natural gypsum or by product gypsum or natural gypsum from different places, even when there are no apparent differences in the physical and chemical properties of the various gypsum.

Some typical figures for the various conditions specified above are:

Temperature range in first chamber _____ 110–125° C.
Corresponding gauge pressure range _____ 6–20 p.s.i.
Corresponding absolute pressure range ___ 21–35 p.s.i.
Residence time in first chamber _____ 5–30 minutes.
Temperature range in subsequent chambers _____ 120°–180° C. but preferably 130°–140° C.
Corresponding gauge pressure range for 120°–180° C. _____ 15–160 p.s.i.
Dewatering and drying temperature _____ More than 80° C. and preferably more than 90° C.

The material in our process is calcined by supersaturated steam, and therefore any change in temperature inevitably produces a corresponding related change in pressure it being axiomatic that pressure and temperature are dependent upon one another, and with specific values being readily available in standard engineering text-books. One such text-book is Perry's Chemical Engineer's Handbook, section 4–49.

One embodiment of the invention is shown diagrammatically in vertical section in FIG. 1. Another form of the invention is shown diagrammatically in vertical section in FIG. 2. A third form of the invention is shown diagrammatically in FIG. 3.

Referring now to FIG. 1 in which the invention is in the form of two revolving chambers 4a and 4b, particulate gypsum is fed into slurry tank 5 where it is kept in suspension by suitable stirrers or gas or steam jets. The slurry is fed via a suitable slurry pump 6, which may, for example, be a "Mono" pump, into a rotating chamber 4a via a pipe 7 which itself forms a seal in a stuffing box at the entry end of the chamber 4a.

The passage of the slurry through chamber 4a and any subsequent chambers is controlled by such factors as the feed rate, the slope of the revolving drum, the height, angle or arrangement of ridges or baffles inside the chamber and by the speed of revolution of the chamber.

The rotating chamber 4a is driven by suitable means, such as by a geared annulus ring 8 via a gear wheel 9.

The steam-water pressure in chamber 4a is maintained at an appropriate level by controlling the heat input to chamber 4a relative to the feed rate. An appropriate steam-water pressure for chamber 4a is 15 p.s.i.g. but pressures between 10 p.s.i.g. and 25 p.s.i.g. have been found to give satisfactory results for different gypsums.

A stuffing box 10 prevents steam escaping at the exit end of the chamber 4a.

The partially calcined material in slurry form, now containing not only some of the water which was in the feed material but that derived from the calcination reaction $$2CaSO_4 \cdot 2H_2O \rightarrow (CaSO_4)2 \cdot H_2O + 3H_2O$$

passes out of the first calcination chamber into a similarly pressurised transfer container or tank 11. From thence it is pumped via another slurry pump 12 through pipe and stuffing box 13 into a revolving chamber 4b. The transfer units 11, 12 are lagged to ensure that there is little or no temperature drop during transfer.

This chamber may be driven in a similar manner to chamber 4a, via a gear wheel 14.

The temperature of chamber 4b is maintained above 120° C., with appropriate steam pressure, and for most fine plasters the temperature of the slurry will be maintained in the range 130° C. to 140° C. and for a period between 5 minutes and 30 minutes.

The residence time of the slurry in chamber 4b may be controlled by similar means to those already outlined for chamber 4a and usually will be somewhat greater than the time of passing through the first chamber.

The fully calcined material passing out of chamber 4b into a tank 16 is then transferred via a pressure reduction valve 17 into a continuous or semi-continuous dewatering device 18 which may be either a continuous centrifuge or a drum filter or other suitable means of dewatering material in slurries. The material in the centrifuge or filter or other device must be maintained above 80° C. preferably above 90° C. to prevent rehydration of the alpha plaster particles.

Hot water 19 is taken off and the partially dewatered material 20 passes, still above 90° C. into a final drier 21 which may be of any suitable form for rapid drying of fine particulate materials. Hot air, 22, at temperatures usually between 110° C. and 160° C. is used to achieve the final drying. Air at substantially higher temperatures may overcalcine the alpha plaster to anhydrite, $CaSO_4$.

The dried alpha plaster passes from the drier into a suitable container 23 or alternatively it may pass directly to a grinding mill for final comminution prior to packaging.

The chambers 4a and 4b may be heated externally or internally by gas or oil or coal or by electricity or by steam. The heating may be direct or indirect as, for example, by steam coils. Because the methods of heating by steam or other means, including a variety of well-known methods, are not regarded as novel, no particular method is specifically described.

Excess steam from chambers 4a and 4b may, if desired, be released through pressure release valves 24 and 25.

Alternatively steam may be blown into the chambers through these valves and inlets.

As an alternative to the revolving chambers shown in FIG. 1 stationary calcination chambers 26 and 27 may be employed as shown diagrammatically in FIG. 2. Other numerals in this illustration have the same connotation as in FIG. 1. Alternate spaced baffle discs 28 and baffle rings 29 are located in each chamber 26 and 27. The transfer zone from 26 to 27 is lagged.

The use of stationary chambers eliminates the necessity for driving mechanisms and of stuffing boxes. On the other hand, it is sometimes more difficult to control the flow of slurries through fixed baffled chambers than through a revolving drum. More uniform flow of the slurries can be achieved by applying a vibration to the walls of the pressurized vessels or alternatively to cause at least some of the baffles 28, 29 in the chambers to move or rotate.

A form of the invention in which steam is used internally to heat the slurry in lagged chambers is shown diagrammatically in FIG. 3. In this case gypsum slurry from tank 5 is pumped by means of slurry pump 6 into pressure chamber 26 via a tangential opening 30 near the top of the cylindrical tank. This gives the slurry a more or less spiral motion in the chamber or tank and it moves down slowly to outlet 31 and thence by a lagged pipe 32 to a similar tangential opening 33 in chamber or tank 27. After passing down tank 27 in a generally spiral path it emerges via pressure release valve 17 into the dewatering stage 18 and the substantially dewatered plaster 20 still above 90° C. passes to the drier 21.

Steam at an appropriate pressure, e.g., 100 p.s.i.g., is blown in via pressure line 34 and passes down to near the conical bottoms of chambers 26 and 27 via pipes 35 and 36 respectively. The amount and rate of steam admitted is controlled by valves 37 and 38.

The slurry enters chamber 26 at a temperature usually between 70° and 95° C. and is heated by the steam being blown into chamber 26 until it emerges at 31 between 115° and 120° C. In chamber 27 it is heated still further by the hot steam injection and emerges from the base of chamber 27 at a temperature between 130° C. and 150° C.

The near boiling water 19 removed from the alpha hemihydrate crystals in the dewatering stage is conveniently piped back to slurry tank 5, carrying with it both heat and a small amount of calcium and sulphate ions in solution.

It is desirable that there be the maximum economy with respect to the heat utilized in the various systems. Appropriate lagging or heat shields and heat exchanges are desirable, both around the calcination chambers and around the dewatering device and drier.

The operation of the calcining chambers may be controlled by appropriate instrumentation, as, for example, pressure gauges connected to the inlet or outlet pipes and thermocouples inserted through either end or both ends of the reaction chambers.

Typical additions, if any, to the feed slurry will be small quantities of chemicals such as succinic or maleic acid or their alkali salts which are known, per se, to assist in the formation of small more or less equi-axed crystals of alpha plaster.

The two stage heating method has been tested on by-product gypsum from a Nissen phosphoric acid plant in Newcastle, Australia. The alpha plaster produced when ground in a ball mill to pass 100 mesh (B.S. screen) and mixed with water to give standard consistency produced cubes with crushing strengths above 7500 p.s.i.

What I claim is:

1. A method of manufacturing alpha plaster comprising the steps of feeding particulate gypsum in the form of a slurry with water, with or without other additions, at a controlled rate into a heated chamber pressurised with steam and water and at a temperature between 110° C and 125° C., with corresponding gauge and absolute pressure being within the respective approximate ranges of 6–20 p.s.i. and 21–35 p.s.i., and with such residence time that the particles of gypsum are substantially converted to fine crystals of alpha hemihydrate, transferring the reacted slurry to another or other chambers at higher temperatures but not above 180° C., and at corresponding gauge and absolute pressures not exceeding 160 p.s.i. and 175 p.s.i., respectively, allowing sufficient residence time in this chamber or these chambers for the minute crystals of alpha hemihydrate to grow, removing the calcined material from the last pressurised chamber and dewatering and drying it, while still maintaining a temperature high enough to prevent substantially rehydration of the alpha plaster, until it has substantially dried.

2. In combination at least two calcining chambers, means for controlled feeding of the first chamber at or near one end with a slurry of particulate gypsum in water, means for causing the slurry to move continuously through the second and any subsequent chambers, means end, means including pressurized steam and water for heating the contents of the chamber to a temperature between the range of 110° C. and 125° C., with corresponding gauge pressure within the range of 6–20 p.s.i., means for transferring the partially calcined material from this first chamber to another or other chambers at higher temperatures but not exceeding 180° C., and corresponding pressures, not exceeding 160 p.s.i. gauge pressure, such transfer being carried out in such a manner as to prevent the temperature of the slurry from dropping substantially below the temperature in the first chamber, means for causing the slurry to move continuously through the second and any subsequent chambers, means for maintaining the second and any subsequent chambers at temperatures and pressures higher than that of the first chamber, means for discharging the alpha plaster in slurry form from the last calcining chamber and means for dewatering and drying such slurry while still maintaining the temperature high enough to prevent substantially any rehydration of the alpha plaster.

3. In combination at least two calcining chambers, means for controlled feeding of the first chamber at or near one end with a slurry of particulate gypsum in water, means for causing the slurry to move continuously through the chamber to an outlet at or near the other end, means including pressurised steam and water for heating the contents of the chamber to a temperature between the range of 110° C. and 125° C., with corresponding gauge pressures within the range of 6–20 p.s.i., means for transferring the partially calcined material from this first chamber to another or other chambers at higher temperatures but not exceeding 180° C. and corresponding pressures, not exceeding 160 p.s.i. gauge pressure, such transfer being carried out in such a manner as to prevent the temperature of the slurry from dropping substantially below the temperature in the first chamber, means for causing the slurry to move continuously through the second and any subsequeut chambers, means for maintaining the second and any subsequent chambers at temperatures and pressures higher than that of the first chamber, means for discharging the alpha plaster in slurry form from the last calcining chamber, means for dewatering such slurry while still maintaining the temperature of the slurry high enough to prevent substantially any rehydration of the alpha plaster, means for transferring the substantially dewatered slurry to a final drier which is maintained at a temperature suitable for rapid drying of the particulate alpha plaster but not high enough to further calcine it to anhydrite, and means for discharging the substantially dried alpha plaster to a suitable container or directly to a grinding machine.

4. Apparatus as in claim 2 wherein each chamber slopes downwards from the gypsum and inlet end to the outlet end and the means for moving the gypsum through each chamber comprise the down sloping chamber and means for rotating the chamber.

5. Apparatus as in claim 2 wherein the successive chambers are elongated and disposed side by side and with their lengths approximately upright, each having a lower end outlet connected to an upper end inlet to the one below it, the gravity flow through each chamber being partly controlled by vertically spaced alternate baffle discs and baffle rings mounted approximately horizontally in each chamber.

6. Apparatus as in claim 2 wherein the successive chambers are elongated and disposed side by side and each has an upper end inlet and a lower end outlet.

7. Apparatus as in claim 6 wherein the means for heating the first chamber is steam supplied to the mass of slurry in the chamber near the bottom of the chamber.

8. Apparatus as in claim 7 wherein similar heating means are used for maintaining the second and subsequent chambers at a temperature and pressure higher than those of the first chamber.

References Cited

UNITED STATES PATENTS

| 781,747 | 2/1905 | Simonds. | |
| 2,074,937 | 3/1937 | Randel et al. | 263—32 X |
| 2,812,934 | 11/1957 | Gordon | 263—32 |
| 2,879,982 | 3/1959 | Paley | 263—32 |

FOREIGN PATENTS

| 392,780 | 5/1933 | Great Britain. |

FREDERICK L. MATTESON, JR., *Primary Examiner.*

R. A. DUA, *Assistant Examiner.*